Patented Aug. 14, 1951

2,564,487

UNITED STATES PATENT OFFICE 2,564,487

METHOD OF PREPARING SHARK MEAT FOR CANNING

Perry W. Mader and Gerstle I. Mader, Robertsdale, Ala., assignors to Food Research Institute, Inc., a corporation of Alabama No Drawing. Application August 13, 1949, Serial No. 110,226

9 Claims. (Cl. 99—188)

This invention relates to a method of preparing shark or like meat for canning and has for an object to provide such a method whereby the substances which cause the meat to spoil are removed from the meat.

A further object is to provide a method of preparing shark or like meat for canning whereby the meat may be safely canned without attacking the metal container.

A still further object is to provide a method of preparing shark meat for canning wherein the vitamins shall not be destroyed and the food shall not be toxic.

As is well known, in some countries, for example in Iceland, Greenland and in the Orient, shark meat is used as food for dogs, and is often eaten by the natives. Shark meat, when in the dried state, or when semi-putrid is quite wholesome, but when fresh it produces a kind of toxic poisoning both in dogs and humans. Because of this poisoning effect, the natives only eat shark meat when it has become partly rotten or when dried.

Difficulties have heretofore been encountered in canning shark meat because of the chemical reaction between the metal container in which the meat is to be preserved and the chemicals within the shark meat. In all attempts to can shark meat, as heretofore known to us, the meat soon spoils and the metal of the container is attacked. The flesh of the shark undergoes certain chemical changes within a few hours after the fish is caught and bruising or throwing it about hastens such change. While we do not know what these changes are, it is believed that they produce an ammonium compound in the flesh of the shark which causes the meat to spoil.

We have discovered a method of preparing shark meat for canning whereby the substances that cause the meat to spoil are removed from the meat thereby preventing the spoilage of the meat. In carrying out our improved method we bring about a sudden release of a large volume of carbon dioxide in the boiling water in which the meat is being cooked, and in the presence of an alkali metal salt, such as potassium nitrate. The vessel in which the meat is being cooked is allowed to boil over for a limited time and the deleterious components of the flesh are thus carried away. While we do not understand the chemical reactions which take place, we have observed that they do take place when the carbon dioxide is released in the boiling water in which the meat is being cooked. Instead of supplying the carbon dioxide by mixing vinegar with bicarbonate of soda, a direct supply of carbon dioxide may be supplied to the container by placing Dry Ice in the bottom of the container and allowing the carbon dioxide to bubble up through the boiling mixture or by supplying the gas through pipes into the container.

In preparing the meat for canning we trim all the soft and dark meat from the gills and cut the meat up into pieces of convenient size. From 100 to 150 pounds of the meat is washed in cold salty water and rinsed carefully in chilled water. The meat is next placed in a 300 gallon steam jacketed open kettle and sufficient water is added to cover the meat which usually requires around 100 gallons. This fills the kettle nearly to the top. Next we add from ½ to 1½ pints, preferably 1 pint, or approximately one part in 800 parts water, of acid vinegar approximately 5% acetic acid strength and the solution in the kettle is allowed to boil until it starts to boil over. Then we add from 1 to 3 ounces, preferably 1½ ounces of potassium nitrate or sodium nitrate and allow the contents of the kettle to continue boiling for from 10 to 15 minutes. We next add from 7 to 11 ounces, by weight, preferably 9 ounces, of bicarbonate of soda, or approximately one ounce for 12 gallons of water. This brings about a sudden and violent release of approximately 12 quarts of carbon dioxide gas in the water at 100° C. The kettle immediately begins to boil over and a strong pungent odor is noticed. The contents of the kettle are allowed to boil over the sides for from 8 to 12 minutes. The meat is then removed from the kettle and allowed to drain and is cooled by a fan to hasten the evaporation. When the meat has thoroughly cooled and is drained it is prepared for canning in the usual manner.

While we do not know just what chemical reactions take place when our invention is carried out, it is believed that the carbon dioxide, which is released when the vinegar comes in contact with the bicarbonate of soda in the presence of potassium nitrate or sodium nitrate, bubbles up through the solution and in boiling over thereby removes the substances which cause the meat to spoil. While the exact volume of carbon dioxide released is uncertain its believed the bicarbonate of soda may combine with some of the fatty acids of the shark meat, thereby releasing some carbon dioxide in addition to the carbon dioxide released upon adding vinegar and bicarbonate of soda to the boiling solution. If the entire 9 ounces of bicarbonate of soda introduced into the kettle is neutralized at 100° C. over 80 quarts of carbon dioxide would be released.

It is further believed that upon boiling the shark meat in water the ammoniacal compounds within the meat become dissolved in the water. As is well known the solubility of ammonia in a liquid depends in part on its pressure as a gas above the liquid. By bubbling a gas up through the solution the ammonia is removed because the stream of gas sweeps the ammonia gas just above the liquid away and thus reduces its partial pressure in the air immediately above the liquid. Under such conditions the ammonia passes continuously out of the liquid due to the steady disturbance of solution equilibrium.

As is well known, constant cooking of foods in bicarbonate of soda destroys the vitamins, but in our improved preparation of shark meat for canning we have found that the vitamin content of the food so canned has not been destroyed. The food is not toxic and there is no loss of protein.

We wish it to be understood that we do not desire to be limited to the exact details of carrying out our invention as herein described, for obvious modifications will occur to a person skilled in the art.

What we claim is:

1. The method of preparing shark meat for canning, which comprises, cooking the meat in water with free surface boiling and concomitantly releasing carbon dioxide in the boiling water.

2. The method of preparing shark meat for canning, which comprises, cooking the meat in water with free surface boiling and concomitantly releasing carbon dioxide in the boiling water in the presence of potassium nitrate.

tle and consists essentially of one part vinegar to 800 parts of water, heating the solution until it starts to boil over, adding from 1 to 3 ounces of potassium nitrate, continuing the boiling for 10 to 15 minutes, then adding from 7 to 11 ounces of bicarbonate of soda, and allowing the mixture to boil over for from 8 to 12 minutes.

6. In the method of preparing shark meat for canning, the steps which comprise, boiling the meat in water at atmospheric pressure, releasing carbon dioxide gas in the boiling water, and allowing the mixture to boil over.

7. The method of preparing shark meat for canning, which comprises, placing the meat in an open vessel containing sufficient water to cover the meat and to nearly fill the vessel and containing vinegar in the proportion of one part vinegar to 800 parts of water, heating the contents of the vessel until the solution boils, next adding potassium nitrate in the proportion of from 1 to 3 ounces by weight of potassium nitrate for each 100 gallons of water used, continuing to boil for from 10 to 15 minutes, then adding bicarbonate of soda in the proportion of from 7 to 11 ounces by weight of bicarbonate of soda for each 100 gallons of water used, continuing to boil and allowing the solution to boil over for from 8 to 12 minutes.

8. The method of preparing shark meat for canning, which comprises, placing the meat in an open vessel containing sufficient water to cover the meat and to nearly fill the vessel, heating the vessel until the water boils thereby causing the ammoniacal compounds within the meat to become dissolved in the water, reducing the partial pressure in the air immediately above the solution by passing carbon dioxide gas therethrough, continuing to boil while disturbing the